G. CALDWELL.
MANHOLE COVER.
APPLICATION FILED JUNE 22, 1914.
1,131,327.
Patented Mar. 9, 1915.
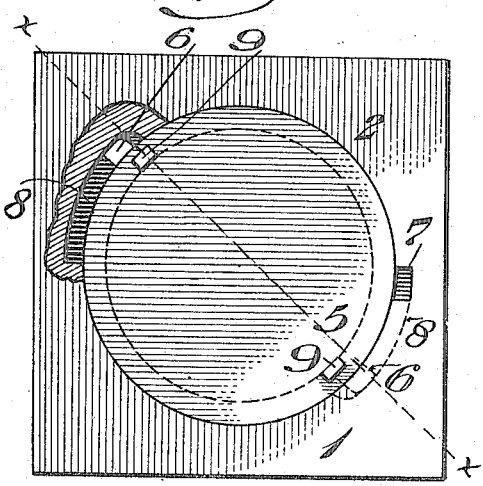
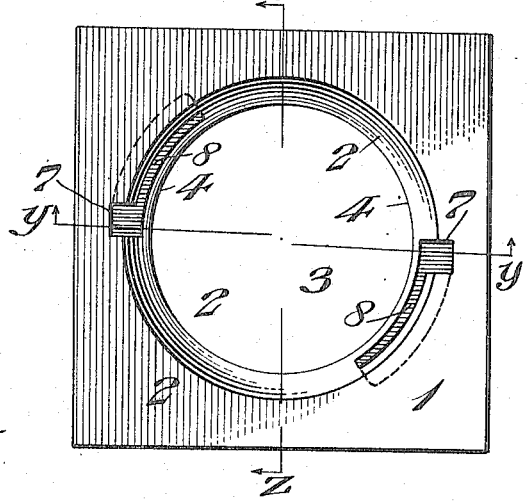
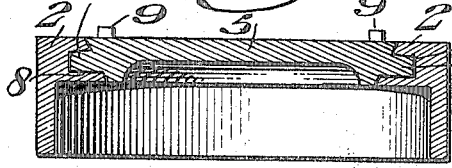
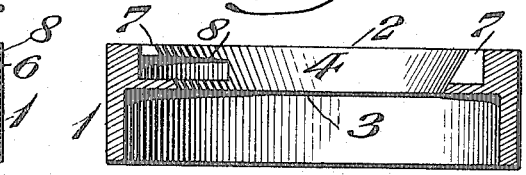
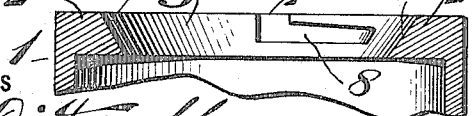
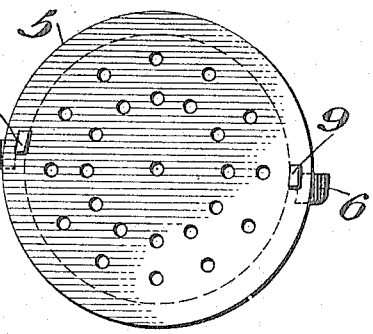
WITNESSES
INVENTOR
George Caldwell.
BY
Wiederstein + Fairbanks.
ATTORNEYS

UNITED STATES PATENT OFFICE.

GEORGE CALDWELL, OF PHILADELPHIA, PENNSYLVANIA.

MANHOLE-COVER.

1,131,327.   Specification of Letters Patent.   Patented Mar. 9, 1915.

Application filed June 22, 1914. Serial No. 846,446.

*To all whom it may concern:*

Be it known that I, GEORGE CALDWELL, a citizen of the United States, residing in the city and county of Philadelphia, State of Pennsylvania, have invented a new and useful Manhole-Cover, of which the following is a specification.

My invention consists of a manhole cover which is formed of a box or casing with a circular opening in its top, and a cover proper adapted to occupy and close said top, said casing having at the top an inturned rim, whose inner face comprises the wall of said opening, the same being conical and in which face directly are segmental passages, the walls of which are tapering or spiral in the direction around the face, and said cover is composed of a body or disk having a conical periphery which accords with the conical wall of said rim, and is adapted to be seated snugly thereon, said cover having lugs or tongues which project directly outwardly from its conical periphery, and are adapted to enter and ride in said passages, thus tightening the cover on the rim.

The invention is satisfactorily illustrated in the accompanying drawing, but the important instrumentalities thereof may be varied, and so it is to be understood that the invention is not limited to the specific details shown and described.

Figure 1 represents a top or plan view partly broken away of a manhole cover embodying my invention. Fig. 2 represents a top or plan view of the casing, the cover proper being removed. Fig. 3 represents an irregular vertical section on line *x—x* Fig. 1. Fig. 4 represents a vertical section on line *y—y* Fig. 2. Fig. 5 represents a vertical section on line *z—z* Fig. 2. Fig. 6 represents a side elevation of the cover proper. Fig. 7 represents a top or plan view of a ventilating cover proper that may be used.

Similar numerals of reference indicate corresponding parts in the figures.

Referring to the drawings, 1 designates the box or casing for a manhole, the same being of any suitable height and having on its upper end, the inturned rim 2 which forms the circular opening 3 by which access is had to the interior of the casing. The wall 4 of said opening which is the inner periphery of said rim is conical in form, its wider diameter being above.

5 designates the cover of the casing, the same being formed of a circular body adapted to enter the opening 3, its periphery being conical in form, the widest diameter whereof is above, said cover being adapted to be seated on the wall 4, and so sustained thereon without liability to fall through said opening 3. On the conical periphery of said cover are the tapering lugs or tongues 6 which project outwardly horizontally directly therefrom.

In the conical wall of the opening 3 are the vertical throats or inlets 7, and the segmental passages 8, whose walls taper from the lower ends of said throats to their side terminals somewhat of screw threads or spiral form, it being noticed that when the cover is presented to the top of the casing, and the lugs 6 placed in register with the throats 7, the cover is lowered whereby it is seated on the conical wall 4 of the rim 2, thus occupying the opening 3, and covering and closing the manhole. Then the cover is rotated whereby the said lugs ride down the passages 8 and tighten against the inclined walls thereof, thus locking the cover in position and tightening it firmly against the wall of the rim, forming a close joint therewith, so as to prevent rattling or wabbling when the cover is passed-over.

It is evident that the cover may be released and removed by rotating it in reverse direction to its full extent. When the lugs reach the vertical throats or inlets 7 the cover may be raised from the rim, the lugs passing through said throat.

To assist in the operation of the cover, the same is provided with finger-pieces 9 for evident purposes. Should it be desired to ventilate the manhole, the cover may be formed with openings therethrough as shown in Fig. 7.

It will be seen that the conical periphery of the cover proper is utilized to have the tightening lugs or tongues directly thereon, and the conical periphery of the rim of the casing is utilized to have the screw-like passages therein, thus simplifying the construction of the device, as other attached rims, flanges, shoulders or the like on said casing and cover proper are avoided, while also reducing weight and expense. Again it will be noticed that the segmental passages are formed directly in the inner wall of the rim 2 of the box intermediate of the top and bottom of said rim, said wall comprising the opening in the box, consequently when the closure or cover 5 is in operative position, and the lugs 6 occupying said passages, the upper walls of the latter are supported on the lugs 6, and the latter are supported on the lower walls of said passages, and this in addition to the conical joint of the cover and rim formed by the wall of said rim and the periphery of the cover causes the cover to be braced firmly on the rim, and the latter to be well sustained, since the passages and lugs form tongues and groove joints for the cover and rim, thus doubly sustaining the latter one on the other.

As the upper walls of the passages are inclined in the direction of their lengths, and the lower walls parallel with the bottom of the cover, said passages become tapering in their nature so that the lugs wedge with said walls, and thus interlock with said lugs in said passages. Furthermore the positions of the passages and lugs permit the bottom of the cover to terminate at the bottom of the rim, thus shortening the depth of said cover, and saving material in the manufacture of the same.

Having thus described my invention what I claim as new and desire to secure by Letters Patent, is:—

A box having on its upper end an inturned rim, the inner wall of which constitutes the opening of the box of conical form, a segmental passage in said wall, a throat in said rim adapted to lead to the inlet end of said passage, said passage being directly in said wall intermediate of the top and bottom of said rim, and a cover for said box having on the periphery thereof a lug which is outturned directly from said periphery intermediate of the top and bottom of said cover and adapted to enter said passage and engage with a wall thereof.

GEORGE CALDWELL.

Witnesses:
  JOSEPH J. GEGGIS,
  THEODORE L. GRAW.

Copies of this patent may be obtained for five cents each, by addressing the "Commissioner of Patents, Washington, D. C."